United States Patent [19]
Kato et al.

[11] Patent Number: 5,175,206
[45] Date of Patent: Dec. 29, 1992

[54] POLYESTER-MODIFIED VINYL RESIN

[75] Inventors: Yasushi Kato; Hisao Furukawa; Shinji Kagitani; Shoichi Matsumura, all of Kobe, Japan

[73] Assignee: Kanegafuchi Kagaku Kogyo Kabushiki Kaisha, Osaka, Japan

[21] Appl. No.: 607,631

[22] Filed: Oct. 31, 1990

Related U.S. Application Data

[63] Continuation of Ser. No. 374,831, Jul. 3, 1989, abandoned, which is a continuation of Ser. No. 74,019, Jul. 16, 1987, abandoned, which is a continuation of Ser. No. 798,940, Nov. 18, 1985, abandoned.

[30] Foreign Application Priority Data

Nov. 19, 1984 [JP] Japan .................. 59-243600

[51] Int. Cl.⁵ .............................. C08L 67/06
[52] U.S. Cl. .......................... 525/29; 525/7.2
[58] Field of Search ..................... 525/7.2, 29

[56] References Cited

U.S. PATENT DOCUMENTS

| | | | |
|---|---|---|---|
| 3,398,210 | 8/1968 | Plueddemann | 525/29 |
| 3,488,304 | 1/1970 | Baugh | 525/7.2 |
| 3,932,555 | 1/1976 | Goodrich | 525/29 |
| 3,997,485 | 12/1976 | Dowbenko | 525/7.2 |
| 4,278,783 | 7/1981 | Taniyama | 528/23 |
| 4,365,047 | 12/1982 | Ohkawa | 525/447 |

FOREIGN PATENT DOCUMENTS

| | | | |
|---|---|---|---|
| 683582 | 4/1964 | Canada | 525/29 |
| 53-061678 | 6/1978 | Japan | 525/7.2 |
| 54-011357 | 5/1979 | Japan . | |
| 59-020317 | 2/1984 | Japan | 525/7.2 |

*Primary Examiner*—Patricia A. Short
*Attorney, Agent, or Firm*—Antonelli, Terry, Stout & Kraus

[57] ABSTRACT

A silyl group-containing, polyester-modified vinyl resin comprising (A) 3 to 45% by weight of units of a polyester resin including a polymerizable unsaturated group, (B) 5 to 30% by weight of units having a group of the formula (I):

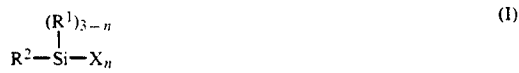

wherein $R^1$ is hydrogen atom or a monovalent hydrolyzable group having 1 to 10 carbon atoms selected from the group consisting of an alkyl group, an aryl group and an aralkyl group, $R^2$ is an organic residue having a polymerizable double bond, X is a hydrolyzable group and n is an integer of 1 to 3, and (C) 25 to 92% by weight of units of a copolymerizable vinyl monomer. The vinyl resin has excellent dispersibility, color match stability and storage stability.

2 Claims, No Drawings

POLYESTER-MODIFIED VINYL RESIN

This application is a continuation of application Ser. No. 374,831, filed Jul. 3, 1989, now abandoned, which is a continuation of application, Ser. No. 074,019, filed Jul. 16, 1987 (now abandoned), which is a continuation of application, Ser. No. 798,940, filed Nov. 18, 1985 (now abandoned).

BACKGROUND OF THE INVENTION

The present invention relates to a silyl group-containing vinyl resin modified with polyester having in its molecule at least one silicon group to which a hydrolyzable group is bonded at the molecular ends or side chains, and having excellent dispersibility, color match stability and storage stability. Japanese Unexamined Patent Publication (Tokkyo Kokai) No. 36395/1979 discloses that a vinyl resin including a silyl group having a hydrolyzable group at the molecular ends or side chains not only has excellent glossiness, weatherability, discoloration resistance, and the like, which are characteristics of the vinyl resin itself, but also has an improved adhesion resulting from the hydrolyzable silyl groups and forms a resin having excellent solvent-resistance, water-resistance, heat-resistance and weatherability and high hardness by causing a cross-linking reaction with water, particularly water in the atmosphere, even at ordinary temperature to form a fine network structure.

There are various methods of the dispersion of pigments or stabilization of color match. Generally, there is carried out a method in which a dispersing agent is employed or a method in which acid or basic polar groups are introduced into a resin. With respect to the use of the dispersing agent, the dispersing agent is effective in the dispersion of a single color, but the enamel paint in which a pigment is dispersed is separated into a clear layer and an enamel layer in a long storage. Also the floating often occurs upon colar matching of different colors. With respect to the method of introducing the acid or base polar groups into the resin, the method is mainly carried out in general resins for use in paint, but in the vinyl resin, it is necessary to introduce many polar groups into the vinyl resin for a poor dispersibility.

With respect to a silyl group-containing vinyl resin that the present inventors have studied, introduction of the many acid or basic polar groups into the resin causes a problem in point of the storage stability of the resin because of having in the resin silyl groups to which the hydrolyzable groups are bonded.

SUMMARY OF THE INVENTION

It has now been found that when the silyl group-containing vinyl resin is modified with a polyester resin, the dispersibility of pigments and the color match stability of pigments are extremely improved, and the resin does not cause a problem in point of the storage stability.

In accordance with the present invention, there is provided a silyl group-containing, polyester-modified vinyl resin comprising (A) 3 to 45% by weight of units of a polyester resin including a polymerizable unsaturated group, (B) 5 to 30% by weight of units having a group of the formula (I):

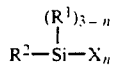

wherein $R^1$ is hydrogen atom or a monovalent hydrocarbon group having 1 to 10 carbon atoms selected from the group consisting of an alkyl group, an aryl group and an aralkyl group, $R^2$ is an organic residue having a polymerizable double bond, X is a hydrolyzable group and n is an integer of 1 to 3, and (C) 25 to 92% by weight of units of a copolymerizable vinyl monomer.

DETAILED DESCRIPTION

The resin of the present invention is the silicon group-containing vinyl resin modified with the polyester (hereinafter referred to as "polyester-modified vinyl resin") having in its molecule at least one, preferably 2 or more silyl groups to which the hydrolyzable groups are bonded at the molecular ends or side chains. Most of the silyl groups are represented by the formula:

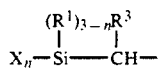

wherein X is a hydrolyzable group, $R^1$ is as defined above, $R^3$ is a member selected from the group consisting of hydrogen atom, an alkyl group having 1 to 10 carbon atoms, an aryl group having 1 to 10 carbon atoms and an aralkyl group having 1 to 10 carbon atoms, and n is an integer of 1 to 3.

The hydrolyzable group (X) includes a halogen atom, an alkoxyl group, an acyloxyl group, a ketoxymate group, amino group, an acid amide group, an aminoxy group, a mercapto group, an alkenyloxy group, and the like.

The polyester-modified vinyl resin of the invention can be prepared by various processes. Among them, it is industrially preferable that the polyester resin having the polymerizable unsaturated group (1), the organic silane compound including the polymerizable unsaturated group (2) and the copolymerizable vinyl monomer (3) are copolymerized.

The polyester resin having the polymerizable unsaturated group (1) employed in the invention is not particularly limited except that the polyester resin must have at least one unsaturated group copolymerizable with the vinyl monomer. The molecular weight of the resin (1) is usually such that the viscosity of a 60% by weight solution of the resin in xylene is from 100 to 10,000 cP.

The polyester resin (1) can be prepared by conventional methods. As components of the polyester resin (1), there are mentioned, for instance, (a) an oil such as safflower oil, soybean oil, linseed oil, castor oil, coconut oil, palm kernel oil, tung oil, dehydrated castor oil, or a fatty acid thereof; (b) an unsaturated dibasic acid such as maleic acid, maleic anhydride, fumaric acid, mesaconic acid, citraconic acid, itaconic acid, chlorinated maleic acid or a saturated polybasic acid such as phthalic acid, phthalic anhydride, tetrahydrophthalic anhydride, succinic anhydride, tetrahydrophthalic acid, adipic acid, sebacic acid, hexahydrophthalic anhydride, tetrachlorophthalic anhydride, tetrabromophthalic anhydride, malonic acid, pyromellitic acid, pyromellitic anhydride, 3,6-endomethylene-1,2,3,6-tetrahydrophtalic anhydride (commercially available under the commercial name "Himic Anhydride"), trimellitic acid, trimellitic anhydride, methylcyclohexene tricarbonic acid; and (c) a polyhydric alcohol such as ethylene glycol, diethylene glycol, propylene glycol, dipropylene glycol, 1,3-butylene glycol, 2,3-butanediol, 2,3-butylene glycol, bisphenol dioxypropyl ether, bisphenol dioxyethyl ether, neopentyl glycol, 1,4-butenediol, 1,6-hexanediol, glycerol, triethylene glycol, trimethylolpropane, pentaerythritol, dipentaerythritol, triethylene glycol, bisphenol A hydride, bisphenol, dihydroxy propyl ether, trimethylolethane, trishydroxymethylaminomethane. The component (a) may be optionally used. The polyester resin (1) can be prepared by heating the components (a), (b) and (c).

Also the polyester resin of the invention (1) is prepared by employing allyl alcohol, allyl glycidyl ether, diallyl alcohol of trimethylolpropane, monoallyl alcohol of trimethylolpropane, glycidyl methacrylate, and the like instead of a part of the (c) component in the above-mentioned process, or by employing crotonic acid, sorbic acid, acrylic acid, methacrylic acid, and the like instead of a part of the (b) component in the above-mentioned process, or by reacting allyl glycidyl ether, glycidyl acrylate, glycidyl methacrylate or the like with a carboxyl group. Moreover, the polyester resin copolymerizable with vinyl monomer (1) can be prepared by employing allyl glycidyl ether, glycidyl acrylate, glycidyl methacrylate, or the like as a part of an epoxy compound in the presence of a tertiary amine upon reacting the epoxy compound with a carboxylic anhydride to prepare the polyester resin.

The organic silane compound including the polymerizable unsaturated group (2) used in the present invention is represented by the formula (I):

$$R^2-\underset{\underset{X_n}{|}}{Si}-(R^1)_{3-n} \quad (I)$$

wherein $R^1$ is hydrogen atom or a monovalent hydrocarbon group having 1 to 10 carbon atoms selected from the group consisting of an alkyl group, an aryl group and an aralkyl group, $R^2$ is an organic residue having a polymerizable double bond, X is a hydrolyzable group and n is an integer of 1 to 3. Examples of the organic silane compound (2) are, for instance, $CH_2=CHSi(OCH_3)_2$, $CH_2=CHSiCl_2$,
          $|$                $|$
         $CH_3$             $CH_3$ $CH_2=CHSi(OCH_3)_3$, $CH_2=CHSiCl_3$, $CH_2=CHCOO(CH_2)_3Si(OCH_3)_2$
                    $|$
                   $CH_3$ $CH_2=CHCOO(CH_2)_3Si(OCH_3)_3$, $CH_2=CHCOO(CH_2)_3SiCl_2$
                 $|$
                $CH_3$ $CH_2=CHCOO(CH_2)_3SiCl_3$, $CH_2=C(CH_3)COO(CH_2)_3Si(OCH_3)_2$
                        $|$
                       $CH_3$ $CH_2=C(CH_3)COO(CH_2)_3Si(OCH_3)_3$, $CH_2=C(CH_3)COO(CH_2)_3SiCl_2$
                     $|$
                    $CH_3$ $CH_2=C(CH_3)COO(CH_2)_3SiCl_3$.

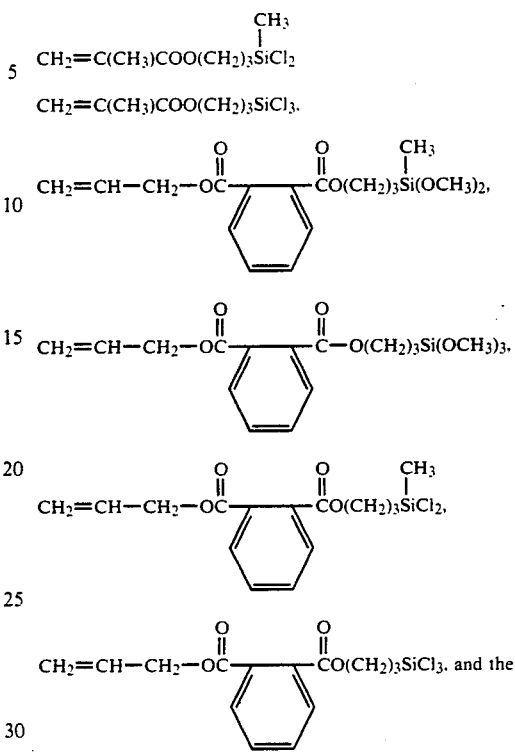

and the like.

The organic silane compounds (2) may be employed alone or in admixture thereof.

The vinyl monomer (3) used in the present invention is not particularly limited. Examples of the vinyl monomer (3) are, for instance, an acrylic acid ester such as methyl acrylate, ethyl acrylate, butyl acrylate or 2-ethylhexyl acrylate; a methacrylic acid ester such as methyl methacrylate, ethyl methacrylate, butyl methacrylate or 2-ethylhexyl methacrylate; a carboxylic acid such as acrylic acid, methacrylic acid, itaconic acid or fumaric acid; an acid anhydride such as maleic anhydride; an epoxy compound such as glycidyl acrylate or glycidyl methacrylate; an amino compound such as diethylaminoethyl acrylate, diethylaminoethyl methacrylate or aminoethyl vinyl ether; an amide compound such as acrylamide, methacrylamide, itaconic diamide, α-ethylacrylamide, crotonamide, fumaric diamide, maleic diamide, N-butoxymethylacrylamide or N-butoxymethylmethacrylamide; a vinyl compound including hydroxyl group such as 2-hydroxyethylacrylate, 2-hydroxyethylmethacrylate, 2-hydroxypropylacrylate, 2-hydroxypropylmethacrylate, 2-hydroxyvinyl ether, N-methylolacrylamide or Aronix 5700 (made by Toagosei Chemical Industry Co., Ltd.); acrylonitrile, iminol methacrylate, styrene, α-methyl styrene, vinyl chloride, vinyl acetate, vinyl propionate, and the like. The vinyl monomers (C) may be employed alone or in admixture thereof.

As the process for preparing the copolymer composed of the polyester resin (1), the organic silane compound (2) and the vinyl monomer (3), there are general solution polymerization processes. That is, the polyester resin (1), the organic silane compound (2), the vinyl monomer (3), a radical initiator, and, if necessary, a chain transfer agent such as n-dodecyl mercaptan, t-dodecyl mercaptan, or mercaptosilane, for obtaining the copolymer having a desired molecular weight, are reacted at 50° to 150° C. As a solvent, it is preferable to employ unreactive solvents such as ethers, hydrocarbons or acetic acid esters, more preferably, a solvent to which an alcohol is added, because of increasing the stability upon preparing the copolymer.

It is preferable that the content of the polyester in the polyester-modified vinyl resin is from 3 to 45% by weight When the content of the polyester is less than 3% by weight, the dispersibility cannot be increased. On the other hand, when the content is more than 45% by weight, the solvent-resistance, staining-resistance and particularly weatherability (yellowing or chalking) of the cured film become poor, and also, the preparation of the copolymer is difficult (the gelation occurs in the course of the polymerization) because of poor stability.

It is preferable that the content of the organic silane compound in the polyester-modified vinyl resin is from 5 to 30% by weight. When the content of silane compound is less than 5% by weight, the solvent-resistance and staining-resistance of the cured film of the invention are poor. On the other hand, when the content of silane compound is more than 30% by weight, the stability of the resin lowers.

The content of the vinyl monomer in the polyester-modified vinyl resin is determined so that the total amount of the polyester resin, the organic silane compound and the vinyl monomer is 100% by weight. Also, kinds of the vinyl monomers are not particularly limited. However, the remarkable increase of the dispersibility of pigments and the adhesion of a cured film to an organic base can be intended by employing a vinyl monomer including a polar group such as a carboxylic acid group, an acid anhydride group, an epoxy group, an amino group, an amido group or hydroxyl group. It is preferable that the content of the vinyl monomer including the polar group is less than 20% by weight in the polyester-modified vinyl resin from the point of the storage stability.

The polyester-modified vinyl resin obtained by the above process can be increased in the flexibility and adhesion other than the dispersibility of pigments As the synthesis of the polyester-modified vinyl resin, there are processes other than the copolymerization method of the polyester resin (1), the organic silane compound (2) and the vinyl monomer (3). For instance, there are a process in which the polyester resin, the vinyl monomer, and allyl methacrylate or allyl acrylate, are copolymerized and an alkoxyl silane, or the like is added to the obtained polyester-modified vinyl resin having double bonds by the silylation in the presence of a catalyst such as platinum compound, a process in which the polyester resin, the vinyl monomer and a monomer including an epoxy group such as glycidyl methacrylate or glycidyl acrylate are copolymerized and the obtained polyester-modified vinyl resin including the epoxy group is reacted with an aminosilane such as γ-aminopropyltrimethoxysilane, a process in which the polyester resin, the vinyl monomer, and a monomer including carboxylic acid group or acid anhydride group such as methacrylic acid, acrylic acid or maleic anhydride are copolymerized and the obtained polyester-modified vinyl resin is reacted with γ-glycidoxypropyltrimethoxysilane.

The polyester-modified vinyl resin of the invention can be employed as a clear coating agent. Moreover, it is preferable that the vinyl resin is employed as a enamel paint by kneading with pigments from the point of the excellent dispersibility. When an enamel paint is prepared by employing the polyester-modified vinyl resin, it is possible that the polyester-modified vinyl resin is employed as a mill base and a silyl group-containing vinyl resin which is not modified with the polyester (the vinyl resin is disclosed in Tokkyo Kokai No. 36395/1979, and the like) is employed as a cut-back.

As a method for increasing the storage stability of the enamel paint, a dispersion method described in Tokkyo Kokai Nos. 80466/1982 and 89661/1983 can be applied.

In the enamel paint employing the vinyl resin of the invention, as a pigment or a filler, a pigment or filler employed in usual paints, coating agents, adhesives, sealants, primers, and the like can be employed. Examples of the pigment are, for instance, an inorganic pigment such as ultramarine blue, iron blue, zinc yellow, red iron oxide, chrome yellow, white lead, carbon black, transparent iron oxide or aluminum powder; azo, triphenylmetane, quinoline, anthraquinone or phthalocyanine organic pigment, or the like; and the like. Examples of the filler are, for instance, silica, calcium carbonate, magnesium carbonate, clay, asbestos, mica, talc, graphite, zinc, zinc oxide, calcium oxide, molybdenum sulfide, glass fiber, and the like. Particularly, carbon black and the organic pigments are preferable.

In the invention, as a dispersion method of paints or fillers, a dispersion method carried out in the dispersion of usual paints, coating agents, adhesives, sealants, primers, and the like can be applied. Examples of the dispersion process are, for instance, a roll mill process, ball mill process, sand mill process, high-speed impeller mill process, a disperser process, kneader process, and the like.

The polyester-modified vinyl resin composition is formed into an excellent resin at the ordinal temperature or by heating. A curing agent may be employed upon the preparation of the vinyl resin. When the curing agent is employed in the invention, for instance, a metal salt of carboxylic acid such as an alkyl titanate, tin octylate, dibutyl tin dilaurylate, lead octylate; sulfide or mercaptide organotin compound such as monobutyl tin sulfide, dibutyl tin dioctyl mercaptide; an acid catalyst such as p-toluenesulfonic acid, phthalic acid or maleic acid; an amine such as tetraethylenepentamine, triethylenediamine, or N-β-aminoethyl-γ-aminopropyltrimetoxysilane; and an alkali catalyst such as calcium hydroxide or sodium hydroxide are effective.

The polyester-modified vinyl resin of the invention can be blended with various resins employed as a paint, coating agent, adhesive, sealant, primer, and the like. For instance, the vinyl resin can be admixed with a lacquer resin, acrylic lacquer resin, thermosetting acrylic resin, alkyd resin, melamine resin, epoxy resin, silicone resin, and the like in a suitable blending ratio. The vinyl resin of the invention can increase the adhesion to the base material and properties of the obtained film such as weatherability.

The present invention is more specifically described and explained by means of the following Examples in which all percents and parts are by weight unless otherwise noted. It is to be understood that the present invention is not limited to the Examples, and various changes and modifications may be made in the invention without departing from the spirit and scope thereof.

PREPARATION EXAMPLE 1

A four neck flask equipped with a stirrer, an inlet for introducing nitrogen gas, a thermometer and a reflux condenser for taking out a formed water was charged with 40 g of coconut oil fatty acid, 13 g of pentaerythritol, 15 g of trimethylolpropane, 30 g of phthalic anhydride and a proper amount of xylene. After the mixture was reacted at 180° C. for 1 hour and at 230° C. for 2 hours, 2 g of maleic anhydride was added to the reaction mixture and further the reaction was carried out at 230° C. for 1 hour to give a polyester resin having a acid value of 4. The obtained polyester resin was diluted to a solid concentration of 60% with xylene to give a polyester resin solution having a viscosity of 1000 cps.

A solution in which 2 g of acrylamide dissolved in 2 g of methanol and 3 g of azobisisobutyronitrile were dissolved in 10 g of the obtained polyester resin solution, 30 g of styrene, 10 g of γ-methacryloxypropyltrimethoxysilane, 20 g of methyl methacrylate, 10 g of n-butyl methacrylate and 20 g of butyl acrylate was added dropwise to 100 g of xylene heated up 100° C., and the reaction was carried out for 10 hours to give a silyl group-containing, polyester-modified vinyl resin having a number average molecular weight of 8,000.

PREPARATION EXAMPLE 2

The same reactor as in Preparation Example 1 was charged with 43 g of coconut oil fatty acid, 10 g of glycerol, 15 g of pentaerythritol, 30 g of phthalic anhydride and a proper amount of xylene. After the mixture was reacted at 180° C. for 1 hour and at 240° C. for 2 hours, 2 g of maleic anhydride was added to the reaction mixture and further the reaction was carried out at 240° C. for 1 hour to give a polyester resin having an acid value of 6. The obtained polyester was diluted to a solid concentration of 60% with xylene to give a polyester resin solution having a viscosity of 2,500 cps.

A solution in which 5 g of azobisisobutyronitrile and 5 g of n-buthanol were dissolved in 15 g of the obtained polyester resin solution, 30 g of styrene, 10 g of γ-methacryloxypropyltrimethoxysilane, 20 g of methyl methacrylate, 10 g of n-butyl methacrylate and 20 g of butyl acrylate was added dropwise to 100 g of xylene heated up 100° C., and the reaction was carried out for 10 hours to give a silyl group-containing, polyester-modified vinyl resin having a number average molecular weight of 6,000.

PREPARATION EXAMPLE 3

A solution in which 3 g of azobisisobutyronitrile was dissolved in 30 g of styrene, 20 g of γ-methacryloxypropyltrimethoxysilane, 20 g of methyl methacrylate, 20 g of n-butyl methacrylate and 10 g of butyl acrylate was added dropwise to 100 g of xylene heated up 100° C. and the reaction was carried out for 10 hours to give a silyl group-containing vinyl resin having a number average molecular weight of 7,000.

EXAMPLES 1 TO 4 AND COMPARATIVE EXAMPLE 1

Titanium oxide (commercially available under the commercial name "CR-90", made by Ishihara Sangyo Kaisha, Ltd.) and Phthalocyanine Blue (commercially available under the commercial name "Cyanine Blue 5195", made by Dainichiseika Color & Chemicals Mfg. Co., Ltd.) were dispersised according to a formation shown in Table 1 to give a white enamel and blue enamels. A weight ratio of a mill base resin/a cut-back resin was 3/7. The dispersion was carried out for 2 hours in mill base and for 30 minutes in cut-back by employing glass beads in a paint shaker.

TABLE 1

| | Mill base resin | Cut-back resin | PWC* | Pigment | Solid concentration (%) |
|---|---|---|---|---|---|
| Ex. 1 | Polyester-modified polymer prepared in Pre. Ex. 1 | Polyester-modified polymer prepared in Pre. Ex. 1 | 10 | Phthalocyanine Blue | 45 |
| Ex. 2 | Polyester-modified polymer prepared in Pre. Ex. 1 | Polyester-modified polymer prepared in Pre. Ex. 1 | 40 | Titanium oxide | 60 |
| Ex. 3 | Polyester-modified polymer prepared in Pre. Ex. 1 | Polymer prepared in Pre. Ex. 3 | 10 | Phthalocyanine Blue | 45 |
| Ex. 4 | Polyester-modified polymer prepared in Pre. Ex. 2 | Polyester-modified polymer prepared in Pre. Ex. 2 | 10 | Phthalocyanine Blue | 45 |
| Com. Ex. 1 | Polymer prepared in Pre. Ex. 3 | Polymer prepared in Pre. Ex. 3 | 10 | Phthalocyanine Blue | 45 |

(Note):
*PWC A percentage of pigment in a whole solid

The results of the dispersibility and the color match stability are shown in Table 2.

DISPERSIBILITY

The enamel diluted with xylene to the volume of twice the original was flow-coated on a glass panel. The surface gloss was observed.

The results are shown in Table 2.

TABLE 2

| | Dispersibility |
|---|---|
| Ex. 1 | Gloss |
| Ex. 2 | Gloss |
| Ex. 3 | Gloss |
| Ex. 4 | Gloss |
| Com. Ex. 1 | No Gloss (Cohesion of pigment) |

COLOR MATCH STABILITY

The white enamel and the blue enamel were admixed in a solid ratio of 9:1 and the mixture was blade-coated on a glass panel by employing a glass rod. Then, the mixture diluted with xylene to the volume of twice the original was flow-coated on a half of the glass panel on which the mixture was blade-coated. The difference of color was observed between the blade-coated surface and the flow-coated surface.

The results are shown in Table 3.

TABLE 3

| Kinds of enamels | Color match stability |
| --- | --- |
| Enamels prepared in Ex. 1 and Ex. 2 | No problem ($\Delta E^*$: 0.6) |
| Enamels prepared in Ex. 2 and Ex. 3 | No problem ($\Delta E^*$: 1.3) |
| Enamels prepared in Ex. 2 and Ex. 4 | A little difference ($\Delta E^*$: 3.8) |
| Enamels prepared in Ex. 2 and Com. Ex. 1 | $\Delta E^*$: 15.7 |

(note)
*: $\Delta E$ is color difference.
$\Delta E$ is measured by employing a color-difference meter made by Nippon Denshoku Kabushiki Kaisha From the results of Table 2, it is recognized that the silyl group-containing vinyl resin modified with the polyester is excellent in the dispersibilty. Also, even if the resin having poor dispersibility is employed, the dispersibility can be improved by employing the resin of the invention having the excellent dispersibility as the mill base. On the other hand, from the results of Table 3, among the silyl group-containing vinyl resin modified with polyester, the vinyl resin copolymerized with the polar monomer shows an excellent tendency in comparison with the vinyl resin copolymerized with the non-polar monomer in the color match stability.

What we claim is:

1. A silyl group-containing, polyester-modified vinyl polymer comprising
    (A) 3 to 45% by weight of units of a polyester resin including a polymerizable unsaturated group,
    (B) 5 to 30% by weight of units of a silane compound of the formula (I):

$$R^2-Si-X_n^{(R^1)_{3-n}} \quad (I)$$

wherein $R^1$ is hydrogen atom or a monovalent hydrocarbon group having 1 to 10 carbon atoms selected from the group consisting of an alkyl group, an aryl group and an aralkyl group, $R^2$ is an organic residue having a polymerizable double bond, X is a hydrolyzable group and n is an integer of 1 to 3, and
    (C) 25 to 92% by weight of units of a copolymerizable vinyl monomer mixture of a vinyl monomer having no polar group and a vinyl monomer having a polar group selected from the group consisting of a carboxylic acid group, an acid anhydride group, an epoxy group, an amino group, an amido group and a hydroxyl group, which is prepared by polymerization of said polyester resin, said silane compound, and said vinyl monomer mixture in the presence of a solvent, or which is prepared by first polymerizing said polyester resin and said vinyl monomer mixture, and then reacting said silane compound with the resulting product.

2. The vinyl polymer of claim 1, which is prepared by polymerization of said polyester resin, said silane compound and said vinyl monomer in the presence of a solvent including an alcohol.

* * * * *